(12) United States Patent
Jnanegowda et al.

(10) Patent No.: US 11,802,629 B1
(45) Date of Patent: Oct. 31, 2023

(54) SOLENOID ACTUATED PRESSURE REGULATOR FOR INFLATION SYSTEM

(71) Applicant: Goodrich Corporation, Charlotte, NC (US)

(72) Inventors: Vasantha Kumara Jnanegowda, Bangalore (IN); Poly John, Cochin (IN); Guangqing Shen, Phoenix, AZ (US); Kamil Krzysztof Czechowski, Mirków (PL); Piotr Józef Zajac, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/888,881

(22) Filed: Aug. 16, 2022

(30) Foreign Application Priority Data

May 18, 2022 (IN) .............................. 202241028606

(51) Int. Cl.
*F16K 31/40* (2006.01)
*F16K 17/40* (2006.01)
*B64D 25/14* (2006.01)

(52) U.S. Cl.
CPC .......... *F16K 31/406* (2013.01); *F16K 17/403* (2013.01); *B64D 25/14* (2013.01)

(58) Field of Classification Search
CPC .... F16K 31/406; F16K 17/403; F16K 31/124; F16K 31/1245; B64D 25/14
See application file for complete search history.

(56) References Cited

U.S. PATENT DOCUMENTS

| 10,481,620 | B2* | 11/2019 | John | G05D 7/0676 |
| 10,969,034 | B2* | 4/2021 | John | F16K 31/383 |
| 11,119,516 | B2* | 9/2021 | Nagaraj | B64D 25/14 |
| 11,169,552 | B2* | 11/2021 | John | G05D 16/2093 |
| 2017/0227134 | A1* | 8/2017 | Tuineag | F16K 31/124 |
| 2019/0353263 | A1* | 11/2019 | John | F16K 31/124 |
| 2020/0326014 | A1* | 10/2020 | John | F16K 31/124 |

* cited by examiner

*Primary Examiner* — Marina A Tietjen
(74) *Attorney, Agent, or Firm* — SNELL & WILMER L.L.P

(57) ABSTRACT

A valve arrangement for inflating an inflatable device includes a valve body comprising an inlet, an outlet, a main fluid channel, a first ball detent, and a second ball detent. A lifter and a sleeve are located in the main fluid channel. A locking ball is disposed at least partially within a locking ball aperture disposed in the sleeve. A piston is coupled to the lifter and fluidly coupled to a command pressure cavity of the valve body. A spring biases the lifter toward a ball locking position whereby the lifter urges the locking ball at least partially into the first ball detent. A valve operation initiator controls a flow of pressurized gas into the command pressure cavity to urge the lifter to a ball releasing position to free the sleeve, as to the locking ball, to translate to an open position to fluidly couple the inlet with the outlet.

20 Claims, 8 Drawing Sheets

SOLENOID ACTUATED PRESSURE REGULATOR FOR INFLATION SYSTEM

CROSS-REFERENCE TO RELATED APPLICATIONS

This application claims priority to, and the benefit of, India Patent Application No. 202241028606, filed May 18, 2022 (DAS Code AE86) and titled "SOLENOID ACTUATED PRESSURE REGULATOR FOR INFLATION SYSTEM," which is incorporated by reference herein in its entirety for all purposes.

FIELD

The present disclosure relates generally to inflatable fluid sources and, more particularly, to a valve arrangement for a pressurized fluid source of an evacuation assembly.

BACKGROUND

Inflatable evacuation systems may be found on various structures, including aircraft, boats, offshore drilling platforms and the like. The systems are typically equipped with an inflatable or an inflatable device, such as, for example, an inflatable slide or an inflatable raft, configured to facilitate rapid evacuation of persons in the event of an emergency. Such inflatables are typically stored in an uninflated condition on the structure in a location readily accessible for deployment. For example, an evacuation slide for a commercial aircraft is stored in an uninflated condition in a case or compartment located proximate an emergency exit.

Systems used to inflate evacuation slides typically employ a gas stored within a cylinder or tank at high pressure, which is discharged into the evacuation slide (or into an inflatable tube comprised within the evacuation slide) within a specific time period. This may be accomplished, for example, by opening a main inflation valve that connects the high-pressure gas to the inflatable tube.

SUMMARY

A valve arrangement for inflating an inflatable device is disclosed, in accordance with various embodiments. The valve arrangement comprises a valve body comprising an inlet, an outlet, a main fluid channel extending along a longitudinal axis of the valve body, a first ball detent at least partially defining the main fluid channel, and a second ball detent at least partially defining the main fluid channel. The valve arrangement further comprises a lifter located in the main fluid channel, the lifter configured to translate along the longitudinal axis of the valve body, a sleeve comprising a locking ball aperture, the sleeve located in the main fluid channel and at least partially surrounding the lifter, a locking ball disposed at least partially within the locking ball aperture, a piston coupled to the lifter, the piston at least partially defining a command pressure cavity, a spring configured to bias the lifter toward a ball locking position, and a valve operation initiator in fluid communication with a source of pressurized gas, the valve operation initiator controls a flow of gas into the command pressure cavity. In response to the valve operation initiator releasing the flow of gas into the command pressure cavity, the piston is configured to translate together with the lifter with respect to the sleeve along the longitudinal axis of the valve body against the bias of the spring from the ball locking position to a ball releasing position.

In various embodiments, in the ball locking position, the lifter urges the locking ball in the locking ball aperture and against the first ball detent so as to lock the sleeve in a closed position whereby the inlet of the valve body is sealed from the outlet of the valve body. In the ball releasing position, the lifter releases the locking ball from the first ball detent so as to allow the sleeve to translate along the longitudinal axis of the valve body from the closed position to an open position to allow gas received at the inlet of the valve body to pass through the inlet of the valve body to the outlet of the valve body.

In various embodiments, the valve operation initiator is a solenoid valve.

In various embodiments, in response to the solenoid valve being energized, the solenoid valve is configured to release the flow of gas into the command pressure cavity.

In various embodiments, in response to the sleeve translating from the closed position to the open position, the locking ball moves with the sleeve into the second ball detent.

In various embodiments, the valve arrangement further comprises a guide bushing coupled to the valve body and at least partially defining the command pressure cavity within the main fluid channel, wherein the lifter extends through the guide bushing.

In various embodiments, the valve arrangement further comprises a frangible burst disk disposed at the inlet of the valve body, wherein the frangible burst disk is configured to burst in response to the sleeve translating from the closed position toward the open position.

In various embodiments, the lifter comprises a recess configured to accommodate the locking ball. In response to the lifter translating to the ball releasing position, the locking ball is configured to move toward the longitudinal axis of the valve body and at least partially into the recess.

In various embodiments, the valve arrangement further comprises a removable cap whereby the spring is accessible within the main fluid channel.

A valve arrangement for a pressurized fluid source is disclosed, in accordance with various embodiments. The valve arrangement comprises a valve body comprising an inlet, an outlet, a main fluid channel extending along a longitudinal axis of the valve body, a first ball detent at least partially defining the main fluid channel, and a second ball detent at least partially defining the main fluid channel. The valve arrangement further comprises a lifter located in the main fluid channel, the lifter configured to translate along the longitudinal axis of the valve body. The valve arrangement further comprises a sleeve comprising a locking ball aperture, the sleeve located in the main fluid channel and at least partially surrounding the lifter. The valve arrangement further comprises a locking ball disposed at least partially within the locking ball aperture and a spring configured to bias the lifter toward a ball locking position. The lifter is configured to translate with respect to the sleeve along the longitudinal axis of the valve body against the bias of the spring from the ball locking position to a ball releasing position. In the ball locking position, the lifter urges the locking ball in the locking ball aperture and against the first ball detent so as to lock the sleeve in a closed position whereby the inlet of the valve body is sealed from the outlet of the valve body. In the ball releasing position, the lifter releases the locking ball from the first ball detent so as to allow the sleeve to translate along the longitudinal axis of the valve body from the closed position to an open position to allow gas received at the inlet of the valve body to pass through the inlet of the valve body to the outlet of the valve body.

In various embodiments, the lifter comprises a recess configured to accommodate the locking ball. In response to the lifter translating to the ball releasing position, the locking ball is configured to move toward the longitudinal axis of the valve body and at least partially into the recess.

In various embodiments, the sleeve at least partially surrounds the recess.

In various embodiments, in response to the sleeve translating from the closed position to the open position, the locking ball moves with the sleeve into the second ball detent.

In various embodiments, the valve arrangement further comprises a guide bushing disposed in the main fluid channel, wherein the lifter extends through the guide bushing.

In various embodiments, the valve arrangement further comprises a frangible burst disk disposed at the inlet of the valve body, wherein the frangible burst disk is configured to burst in response to the sleeve translating from the closed position toward the open position.

In various embodiments, the valve arrangement further comprises a removable cap whereby the spring is accessible within the main fluid channel.

In various embodiments, the valve arrangement further comprises a piston coupled to the lifter.

A method for inflating an inflatable device is disclosed, in accordance with various embodiments. The method comprises energizing a valve operation initiator in fluid communication with a source of pressurized gas, opening the valve operation initiator, releasing a pressurized gas into a command pressure cavity of a valve body, moving a piston against a spring bias of a spring with the pressurized gas, moving a lifter together with the piston along a longitudinal axis of a main fluid cavity of the valve body, urging a locking ball inward toward the longitudinal axis and at least partially into a recess of the lifter, translating a sleeve from an initially closed position to an open position, moving the locking ball together with the sleeve from a first ball detent to a second ball detent as the sleeve moves from the initially closed position to the open position, and fluidly coupling an inlet of the valve body with an outlet of the valve body in response to the sleeve translating from the initially closed position to the open position to release an inflation gas from the source of pressurized gas to the inflatable device.

In various embodiments, the method further comprises rupturing a burst disk with a fluid pressure of the inflation gas in response to the sleeve translating from the initially closed position to the open position.

In various embodiments, the method further comprises capturing the locking ball in a locking ball aperture of the sleeve.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation assemblies. However, various aspects of the disclosed systems and methods may be adapted for performance in a variety of other inflatable assemblies, for example, inflatable raft assemblies, and/or any other assemblies having charged cylinders. As such, numerous applications of the present disclosure may be realized.

A solenoid operated valve assembly of the present disclosure may use a solenoid operated rupture disk valve. The valve assembly utilizes force balancing of the burst disk and locking ball(s) which may not be affected by the bottle pressure reduction with inflation. This way, the bottle gas can be utilized fully for the inflation.

Figure 1:
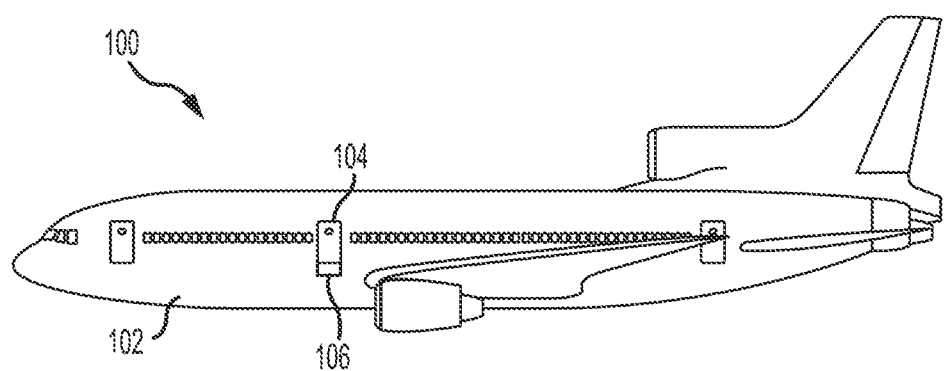
FIG. 1 illustrates an aircraft having an evacuation assembly, in accordance with various embodiments.

Referring now to FIG. 1, an aircraft 100 is shown. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2:
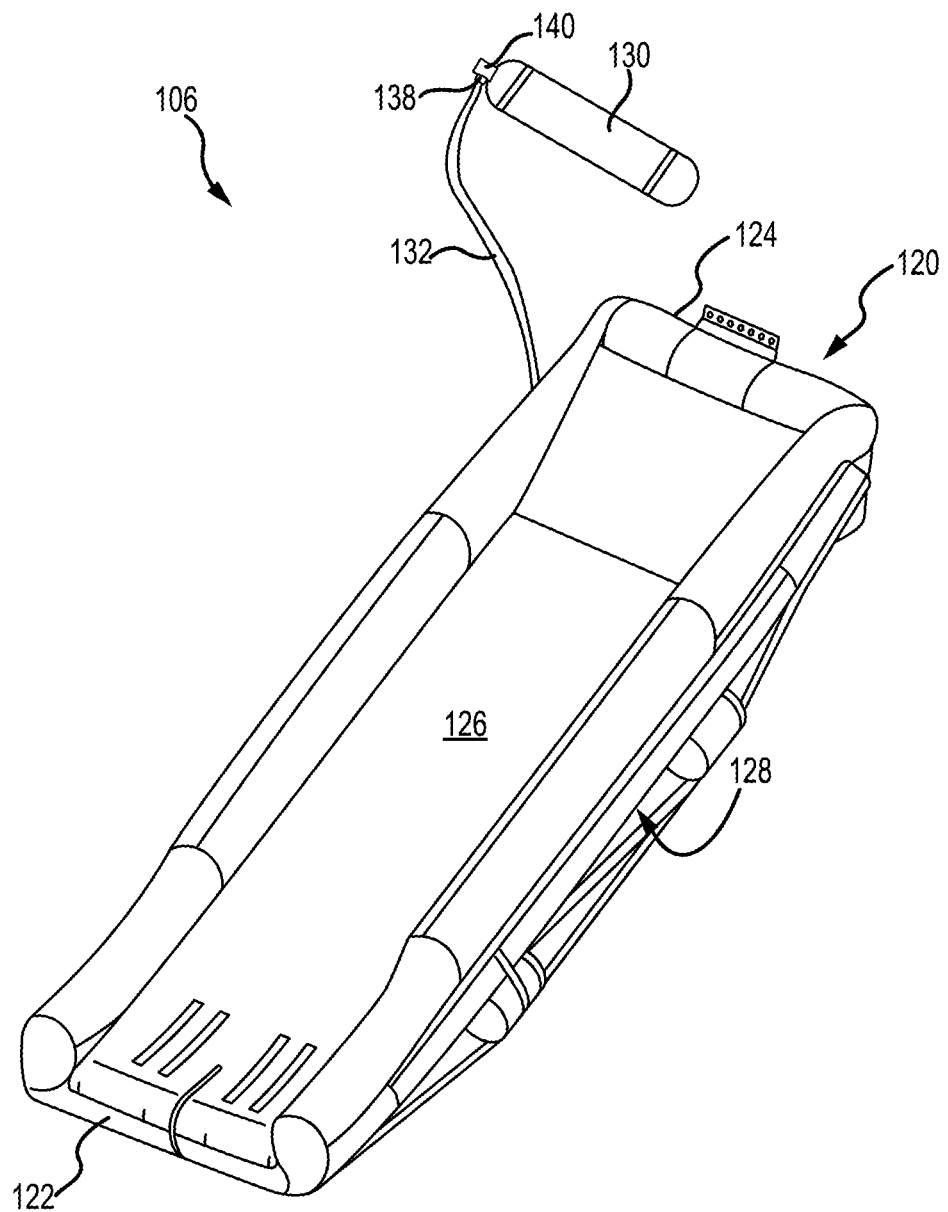
FIG. 2 illustrates an evacuation assembly with the evacuation slide in a deployed position, in accordance with various embodiments.

With reference to FIG. 2, additional details of evacuation assembly 106 are illustrated. In accordance with various embodiments, evacuation assembly 106 includes an evacuation slide 120 and a pressurized fluid source 130. In accordance with various embodiments, evacuation slide 120 includes a toe end 122 and a head end 124 opposite toe end 122. Head end 124 may be coupled to an aircraft structure (e.g., fuselage 102 in FIG. 1). In accordance with various embodiments, evacuation slide 120 is an inflatable slide. Evacuation slide 120 includes a sliding surface 126 and an underside surface 128 opposite sliding surface 126. Sliding surface 126 extends from head end 124 to toe end 122. During an evacuation event, underside surface 128 may be oriented toward an exit surface (e.g., toward the ground or toward a body of water). Evacuation slide 120 is illustrated as a single lane slide; however, evacuation slide 120 may comprise any number of lanes.

Evacuation assembly 106 includes pressurized fluid source 130 (also referred to as a charge cylinder). Pressurized fluid source 130 is configured to deliver a pressurized fluid, such as pressurized gas, to inflate evacuation slide 120. Pressurized fluid source 130 is fluidly coupled to evacuation slide 120. For example, pressurized fluid source 130 may be fluidly coupled to evacuation slide 120 via a hose, or conduit, 132. In response to receiving pressurized fluid from pressurized fluid source 130, evacuation slide 120 begins to inflate.

In accordance with various embodiments, conduit 132 may be connected to a valve outlet 138 of a valve assembly 140 (also referred to herein as a pressure regulator shutoff valve or a solenoid operated pressure regulator cum shut off valve) fluidly coupled to pressurized fluid source 130. In this regard, valve assembly 140 is fluidly coupled between pressurized fluid source 130 and conduit 132. As described in further detail below valve assembly 140 is configured to regulate the flow of pressurized fluid from pressurized fluid source 130 to evacuation slide 120. In this regard, when evacuation slide 120 is in a stowed (or deflated) state, valve assembly 140 is in a closed position. In response to deployment of evacuation assembly 106, valve assembly 140 translates to an open position, thereby allowing fluid to flow from pressurized fluid source 130 to evacuation slide 120.

Figure 3A:
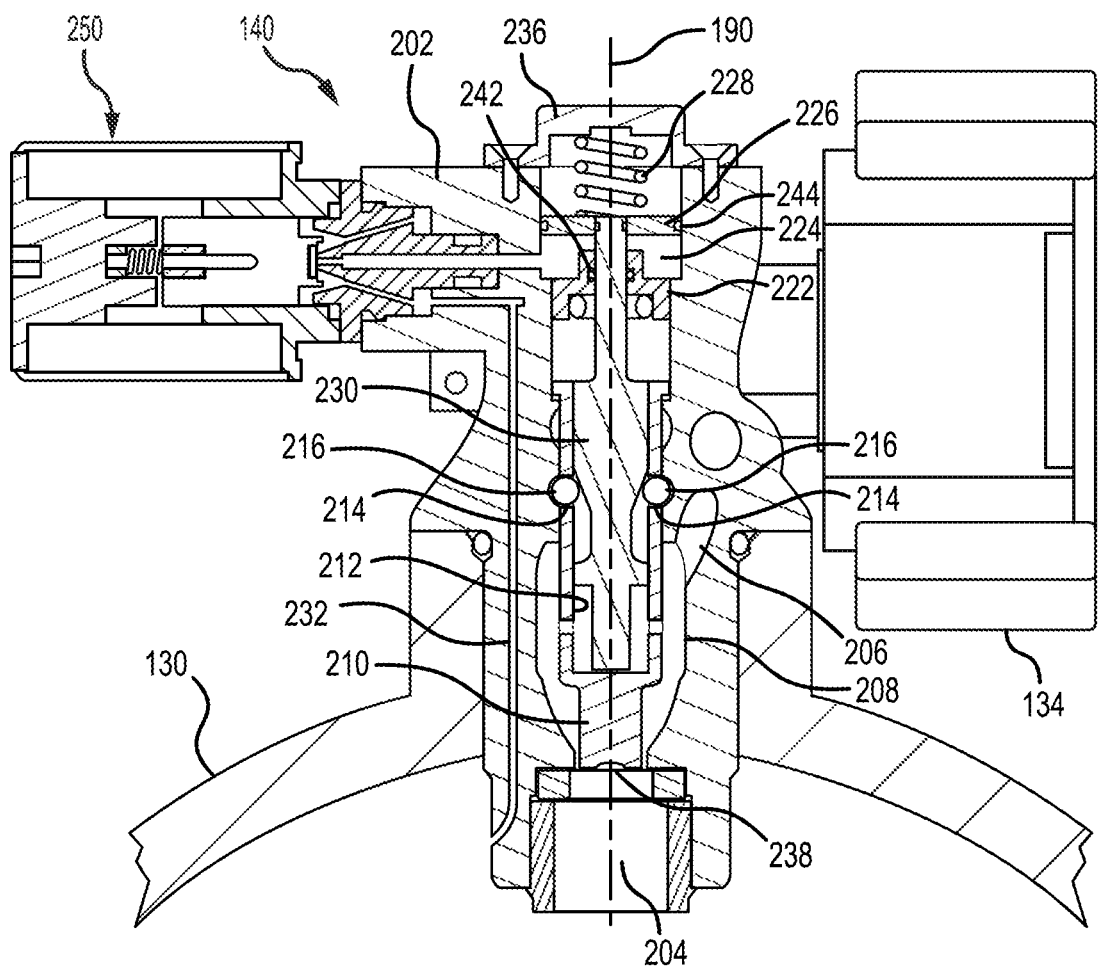
FIG. 3A illustrates a section view of a pressurized fluid source valve assembly, with the valve assembly in a closed position, in accordance with various embodiments.
Figure 3C:
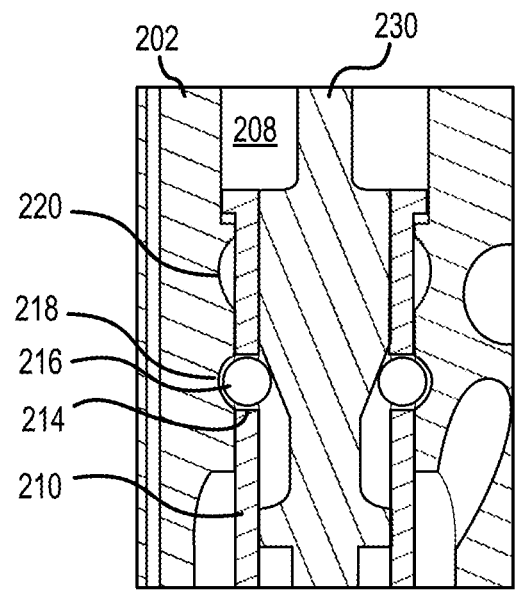
FIG. 3C illustrates an enlarged view of the lifter in a first ball locking position and the locking ball in a first ball detent, in accordance with various embodiments.
Figure 3B:
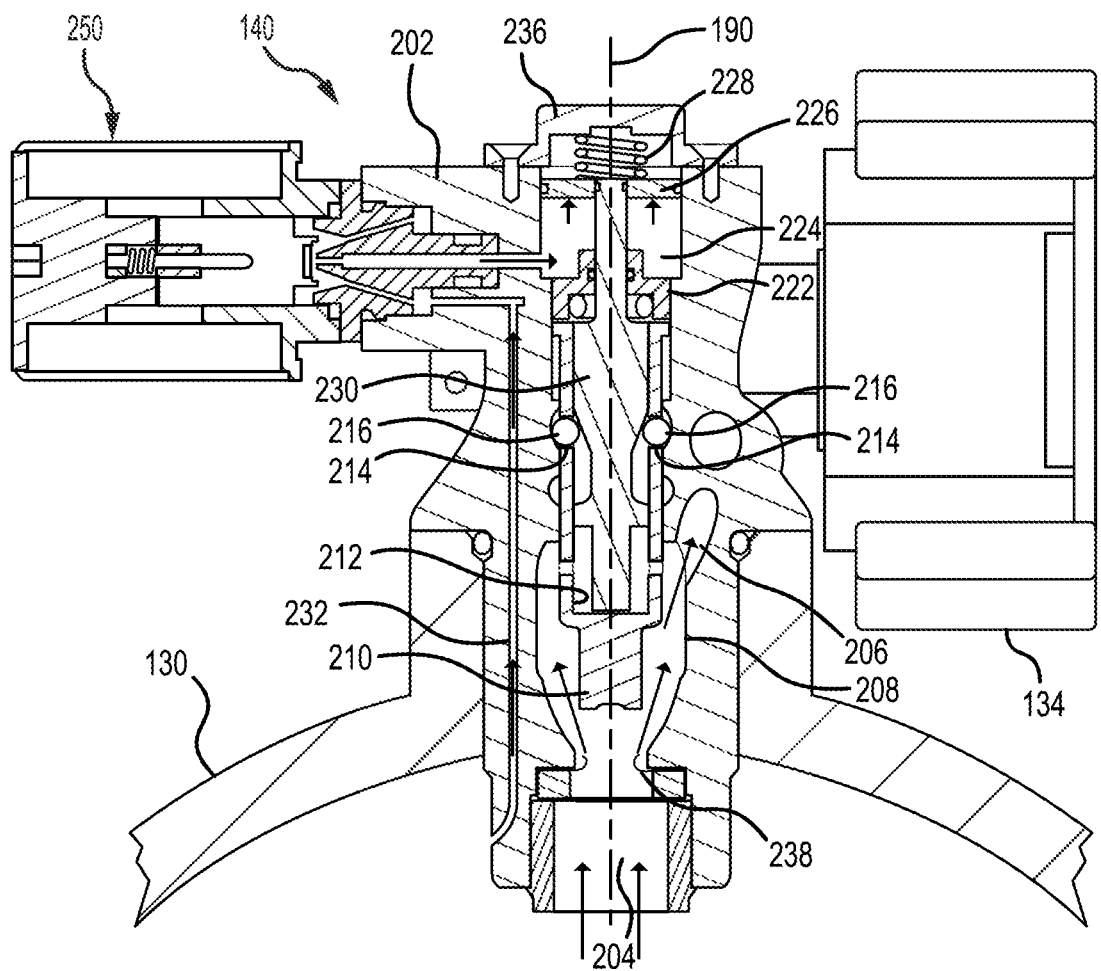
FIG. 3B illustrates a cross-section view of a pressurized fluid source valve assembly, with the valve assembly in an open position, in accordance with various embodiments.
Figure 3D:
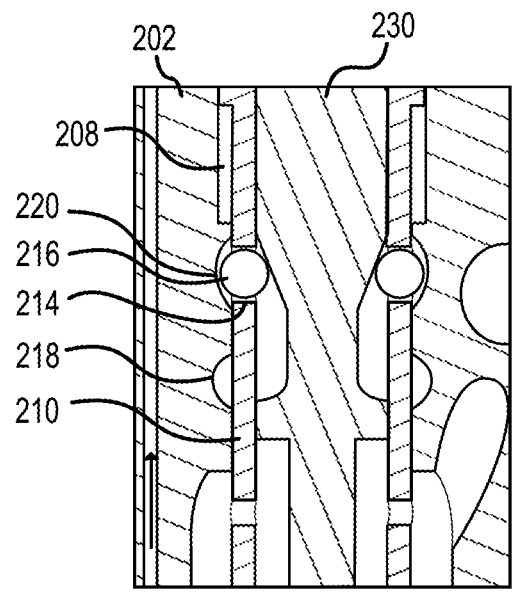
FIG. 3D illustrates an enlarged view of the lifter in a second ball locking position and the locking ball in a second ball detent, in accordance with various embodiments.

With reference to FIG. 3A and FIG. 3B, additional details of valve assembly 140 in a closed position and an open position, respectively, are illustrated. In accordance with various embodiments, valve assembly 140 includes a valve body 202 (also referred to herein as a pneumatic valve body). Valve body 202 may be made from a metal or metal alloy. In various embodiments, valve body 202 comprises an elongate geometry extending along longitudinal axis 190. Valve body 202 may define a valve inlet 204 and a valve outlet 206 of valve assembly 140. Valve body 202 may further define a main fluid channel 208 through valve body 202. Main fluid channel 208 may be coaxial with longitudinal axis 190. Main fluid channel 208 may be fluidly connected with valve inlet 204 and valve outlet 206. Valve assembly 140 receives fluid (e.g., an inflation gas) from pressurized fluid source 130 through valve inlet 204.

A lifter 230 is located in main fluid channel 208. Lifter 230 may be a rod or the like. A sleeve 210 is also located in the main fluid channel 208. Sleeve 210 may comprise a bore 212 configured to receive an end of the lifter 230. In this regard, sleeve 210 may at least partially surround the lifter 230. Sleeve 210 further comprises one or more locking ball apertures 214 configured to receive a locking ball 216 with the sleeve 210. Sleeve 210 may surround the locking ball 216 to capture the locking ball within the locking ball aperture 214.

In various embodiments, a guide bushing 222 is located in the main fluid channel 208. Guide bushing 222 is coupled to the valve body 202 in various embodiments. Guide bushing 222 may at least partially define a command pressure cavity 224 within the main fluid channel 208. Lifter 230 may extend through guide bushing 222. A seal 242, such as a dynamic O-ring for example, may be disposed between the lifter 230 and the guide bushing 222 to prevent leakage from command pressure cavity 224, while still allowing the lifter 230 to move with respect to the guide bushing 222.

In various embodiments, a piston 226 is coupled to the lifter 230. Piston 226 may be connected to lifter 230 and translated within main fluid channel 208 therewith. The piston 226 may at least partially define the command pressure cavity 224. Piston 226 and guide bushing 222 may define opposing longitudinal ends of the command pressure cavity 224. A seal 244, such as a dynamic O-ring for example, may be disposed between the piston 226 and the valve body 202 to prevent leakage from command pressure cavity 224, while still allowing the piston 226 to move with respect to the valve body 202. The seal area of seal 244 may be greater than the seal area of seal 242.

In various embodiments, a spring 228 is configured to bias the lifter 230 toward a ball locking position (see FIG. 3A). Spring 228 may be a coil spring for example. In various embodiments, a removable cap 236 is coupled to the valve body 202. The spring 228 may be accessible within the main fluid channel 208 via the removable cap 236. In various embodiments, spring 228 abuts the removable cap 236.

Valve body 202 comprises one or more first ball detents 218 at least partially defining the main fluid channel 208 in various embodiments. Valve body 202 further comprises one or more second ball detents 220 at least partially defining the main fluid channel 208 in various embodiments. Locking ball 216 is in an initially sleeve locking position at the first ball detent 218 (see FIG. 3A and FIG. 3C). Lifter 230 may be biased into sleeve 210 by spring 228 in the ball locking position. In the ball locking position (see FIG. 3A), lifter 230 biases locking ball 216 outward (i.e., away from longitudinal axis 190) and into the first ball detent 218. Stated differently, in the ball locking position, the lifter 230 urges the locking ball 216 in the first locking ball aperture 214 and against the first ball detent 218 (thereby placing the locking ball 216 in a sleeve locking position) so as to lock the sleeve 210 in the closed position whereby the inlet 204 of the valve body 202 is sealed from the outlet 206 of the valve body 202. In the sleeve locking position, the locking ball 216 mechanically locks the sleeve 210 from translating along longitudinal axis 190. Stated differently, the locking ball 216 is effective to resist the fluid pressure force acting on the sleeve 210 (e.g., a fluid pressure force which is acting through an intermediary member, such as burst disk 238, or if an intermediary member is not present, a fluid pressure force which is acting directly on the sleeve 210). In this manner, the locking ball 216 mechanically locks the sleeve 210 in a closed position (see FIG. 3A), whereby the sleeve 210 seals the inlet 204 from the outlet 206.

In accordance with various embodiments, valve assembly 140 further includes a valve operation initiator, such as solenoid initiator valve 250. Solenoid initiator valve 250 may be a dual solenoid valve. Solenoid initiator valve 250 may be in fluid communication with a source of pressurized gas. Solenoid initiator valve 250 may control a flow of pressurized gas from the source of pressurized gas into the command pressure cavity 224. Solenoid initiator valve 250 may operate to place valve outlet 206 in fluid communication with valve inlet 204, as described herein.

Other components of pressurized fluid source 130 may also be coupled to valve body 202. For example, in various embodiments, a pressure gauge 134, configured to measure a pressure of pressurized fluid source 130, may be operatively coupled to pressurized fluid source 130 via valve assembly 140.

Valve body 202 may include a channel 232 (also referred to herein as a pilot feed channel) whereby a flow of pressurized fluid from pressurized fluid source 130 may be routed to solenoid initiator valve 250. Channel 232 may bypass main fluid channel 208 and route the flow of pressurized fluid through valve body 202 and directly to solenoid initiator valve 250.

In accordance with various embodiments, solenoid initiator valve 250 may move from a closed position (see FIG. 3A) to an open position (see FIG. 3B) whereby a flow of pressurized fluid (represented by arrows 292) from a pressurized fluid source (e.g., pressurized fluid source 130 or another pressurized fluid source) may be routed through solenoid initiator valve 250 into the command pressure cavity 224. In response to solenoid initiator valve 250 moving to the open position, pressurized fluid 292 may flow through channel 232 into solenoid initiator valve 250, and from solenoid initiator valve 250 into command pressure cavity 224. A pressure force from said pressurized fluid 292 may act on piston 226 and overcome the bias of the spring force of spring 228 to move lifter 230 along longitudinal axis 190 away from sleeve 210 with respect to valve body 202. In this regard, in response to the solenoid initiator valve 250 releasing the flow of gas 292 into the command pressure cavity 224, the piston 226 is configured to translate together with the lifter 230 with respect to the sleeve 210 along the longitudinal axis 290 of the valve body 202 against the bias of the spring 228 from the ball locking position (see FIG. 3A) to a ball releasing position (see FIG. 3E).

In the ball releasing position, the lifter 230 releases the locking ball 216 from the first ball detent 218 so as to allow the sleeve 210 to translate along the longitudinal axis 290 of the valve body 202 from the closed position (see FIG. 3A) to an open position (see FIG. 3B) to allow gas received at the inlet 204 of the valve body 202 to pass through the inlet 204 of the valve body 202 to the outlet 206 of the valve body 202.

Figure 3E:
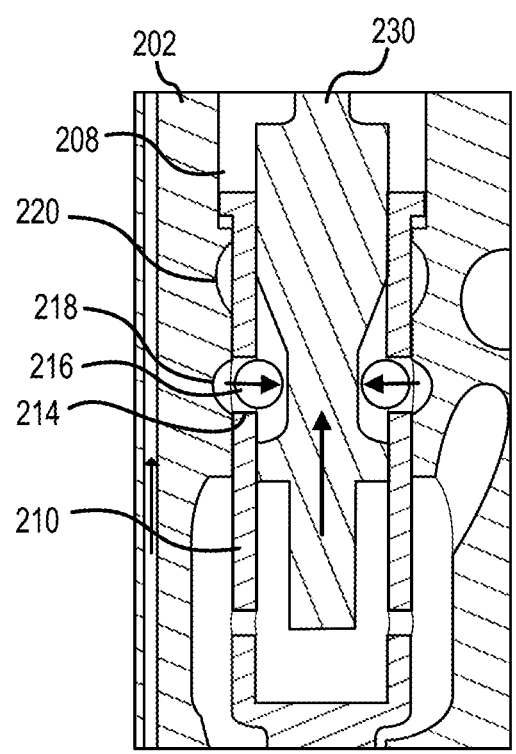
FIG. 3E illustrates an enlarged view of the lifter in a ball releasing position and the locking ball moved inward and released from the first ball detent, in accordance with various embodiments.

With momentary reference to FIG. 3E, the lifter 230 comprises a recess 234 configured to accommodate the locking ball 216 when the lifter 230 is translated against the bias of the spring 228 in various embodiments. In response to the lifter 230 translating to the ball releasing position, the locking ball 216 is configured to move toward the longitudinal axis 290 of the valve body 202 and at least partially into the recess 234. With the locking ball 216 moved out of the first ball detent 218, sleeve 210 is free, as to the locking ball 216, to translate away from inlet 204 to unseal the inlet 204 from the outlet 206. As the sleeve 210 translates toward spring 228, the locking ball 216 remains captured within the locking ball aperture 214 and moves with the sleeve 210 to the second ball detent 220. With the sleeve 210 moved to the open position, the locking ball 216 may contact the lifter 230 and be biased outward and into the second ball detent 220.

The solenoid initiator may be de-energized soon after the valve assembly 140 is opened and the sleeve 210 is locked in the open position. In various embodiments, the pressurized gas trapped in the command pressure cavity 224 sustains the pressure force on the piston 226 to retain the lifter 230 in the open position. However, if this gas pressure is not available, or the command pressure force is reduced to as to not overcome the spring bias force of the spring 228, the open position of the lifter 230 may be sustained by the friction force of the locking ball 216. As the inflation continues, the pressure in pressurized fluid source 130 may be reduced, and the resulting force acting at the locking ball 216 may also be reduced. In this state, the spring force of spring 228 may be effective to retain the friction force at the locking ball 216 (e.g., the spring 228 biases the lifter 230 against the locking ball 216 which urges the locking ball 216 into the second ball detent 220) and the open position of the lifter 230 and the sleeve 210 is sustained until the inflation is complete.

In various embodiments, a frangible burst disk 238 is located at the inlet 204 between the pressurized fluid source 130 and the sleeve 210. In the closed position, sleeve 210 may abut the frangible burst disk 238 to prevent the frangible burst disk 238 from bursting or breaking. As the sleeve 210 translates along the longitudinal axis 290 of the valve body 202 from the closed position (see FIG. 3A) to the open position (see FIG. 3B) away from the frangible burst disk 238, the fluid pressure from the inflation gas from the pressurized fluid source 130 may overcome the strength of the frangible burst disk 238 and cause the frangible burst disk 238 to rupture, thereby allowing the inflation gas to pass through the inlet 204, through the main fluid channel 208, and to exit outlet 206 to an inflatable device.

Figure 4A:
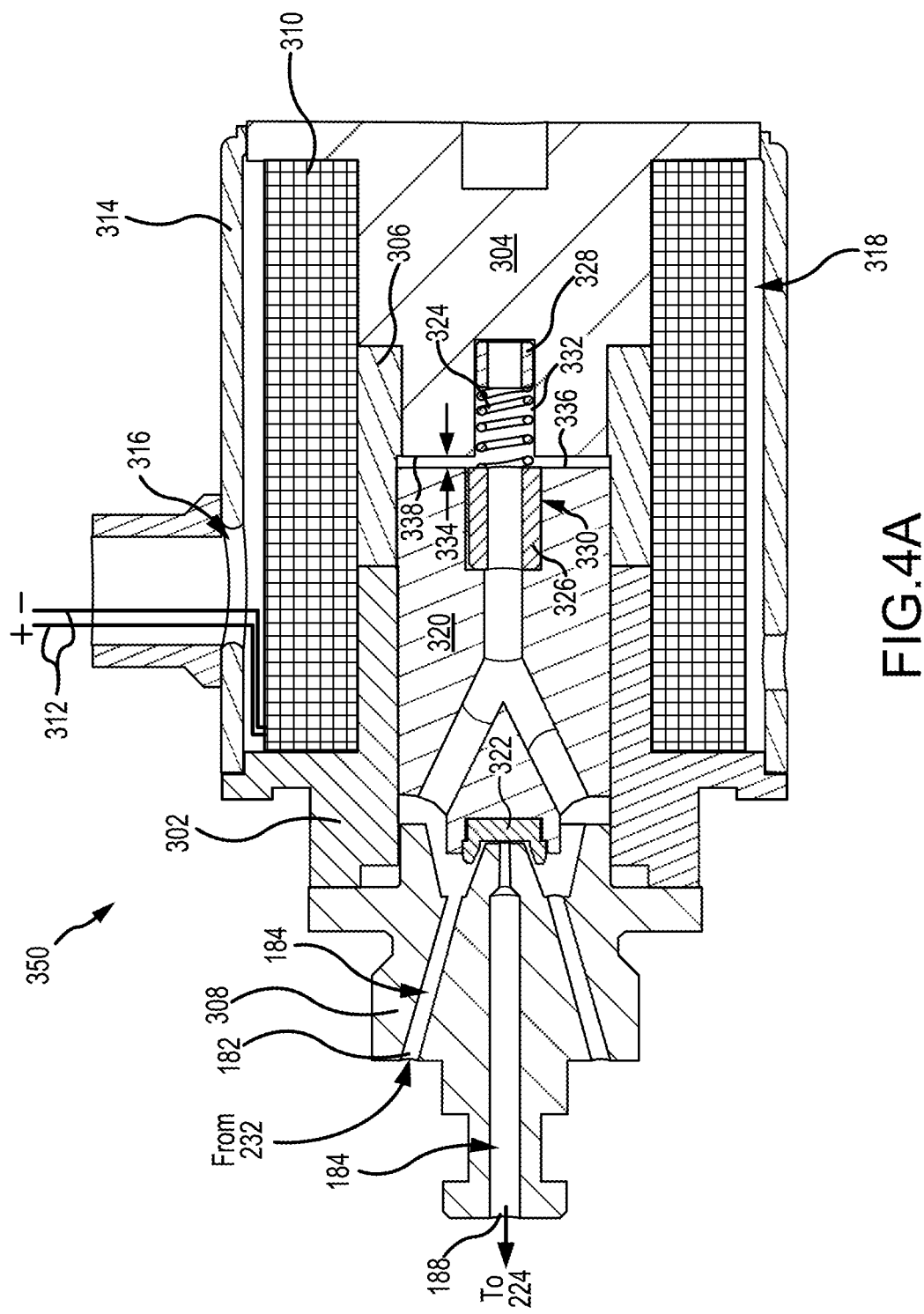
FIG. 4A illustrates a cross-section view of a solenoid initiator valve in the closed position, in accordance with various embodiments.

With reference to FIG. 4A, additional details of a solenoid initiator valve 350 is illustrated, in accordance with various embodiments. In various embodiments, solenoid initiator valve 250 described in FIG. 3A and FIG. 3B is similar to solenoid initiator valve 350. In FIG. 4A, solenoid initiator valve 350 is in the closed position. Solenoid initiator valve 350 includes a core 302 and a bobbin 304. Core 302 may engage fluid fitting 308. Bobbin 304 may engage core fitting 306. Core fitting 306 is formed of a non-magnetic material. Core 302 and bobbin 304 are made of a magnetic material, such as a ferrous metal.

In accordance with various embodiments, one or more solenoid coils 310 is/are wrapped helically around core 302, bobbin 304, and core fitting 306. A set of lead wires 312 (e.g., a positive lead wire and a ground lead wire) is electrically coupled to solenoid coil 310. An insulating layer may be formed over an outer diameter of solenoid coil 310. Solenoid coil 310 is arranged such that, in response to receiving a constant voltage from a power source, a magnetic flux is generated by solenoid coil 310.

A cover 314 may be located around solenoid coil 310. Cover 314 may be coupled, via adhesive, welding, fasteners, or any other suitable attachment to bobbin 304 and/or to core 302. Cover 314 may define a lead wire opening 316 through which the set of lead wires 312 is located. Cover 314, bobbin 304, core 302, and core fitting 306 define a cavity 318 in which solenoid coil 310 is located.

Solenoid initiator valve 350 further includes a plunger 320. Plunger 320 comprises a ferrous metal. Plunger 320 is configured such that plunger 320 will translate in the magnetic flux direction generated by solenoid coils 310. In this regard, the magnetic field generated by solenoid coils 310 forces plunger 320 away from fluid fitting 308. Valve seal 322 is coupled to plunger 320 such that valve seal 322 translates with plunger 320 relative to fluid fitting 308. Plunger 320 is biased toward fluid fitting 308. In various embodiments, a coil spring 324 may bias plunger 320 toward fluid fitting 308. Coil spring 324 may be located between a spacer 326 of plunger 320 and a spacer 328 of bobbin 304. Spacer 326 may be located in a spacer cavity 330 defined by plunger 320. Spacer 328 may be located in spacer cavity 332 defined by bobbin 304. The biasing load generated by coil spring 324 may be applied to plunger 320 via spacer 326. In various embodiments, spacer 326 comprises a non-magnetic material.

In the closed position, the biasing load applied by coil spring 324 to plunger 320 creates a gap 334 between a surface 336 of plunger 320 and a surface 338 of bobbin 304. In the closed position, the biasing load applied by coil spring 324 to plunger 320 maintains a fluid tight seal between fluid fitting 308 and valve seal 322.

Figure 4B:
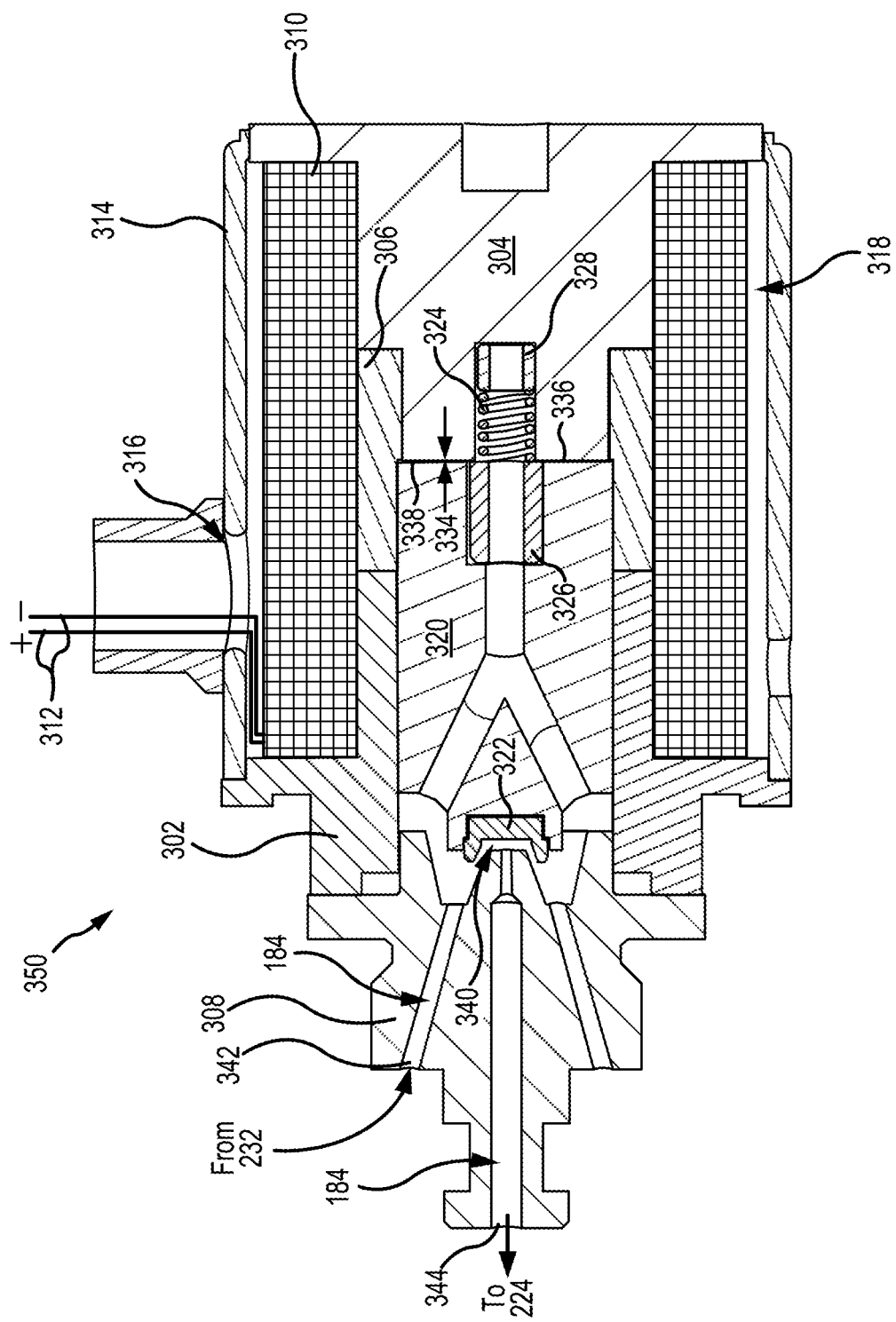
FIG. 4B illustrates a cross-section view of a solenoid initiator valve in the open position, in accordance with various embodiments.

Referring now to FIG. 4B, solenoid initiator valve 350 is illustrated in the open position. In response to receiving a current via set of lead wires 312, solenoid coil 310 generates a magnetic field. In various embodiments, current begins to flow to solenoid coil 310 in response to activation of a power source (e.g., a battery, a capacitor, a generator, or the like). The power source may be activated in response to deployment of evacuation assembly 106 (FIG. 1). For example, opening exit door 104 (FIG. 1) may activate the power source and/or close a circuit to electrically couple the power source to solenoid coil 310, and/or otherwise cause current to flow from the power source to solenoid coil 310. The electromagnetic force due to the magnetic flux value, or ampere-turns, generated by solenoid coil 310 is greater than the biasing load applied by coil spring 324. The electromagnetic force being greater than the biasing load applied by coil spring 324, causes plunger 320 and valve seal 322 to translate away from fluid fitting 308, thereby creating a gap 340 between valve seal 322 and fluid fitting 308.

With combined reference to FIG. 3B and FIG. 4B, the gap 340 between valve seal 322 and fluid fitting 308 fluidly connects inlet 342 and outlet 344 of fluid fitting 308, thereby allowably fluid from pressurized fluid source 130 to flow from channel 232 to command pressure cavity 224.

Figure 5:
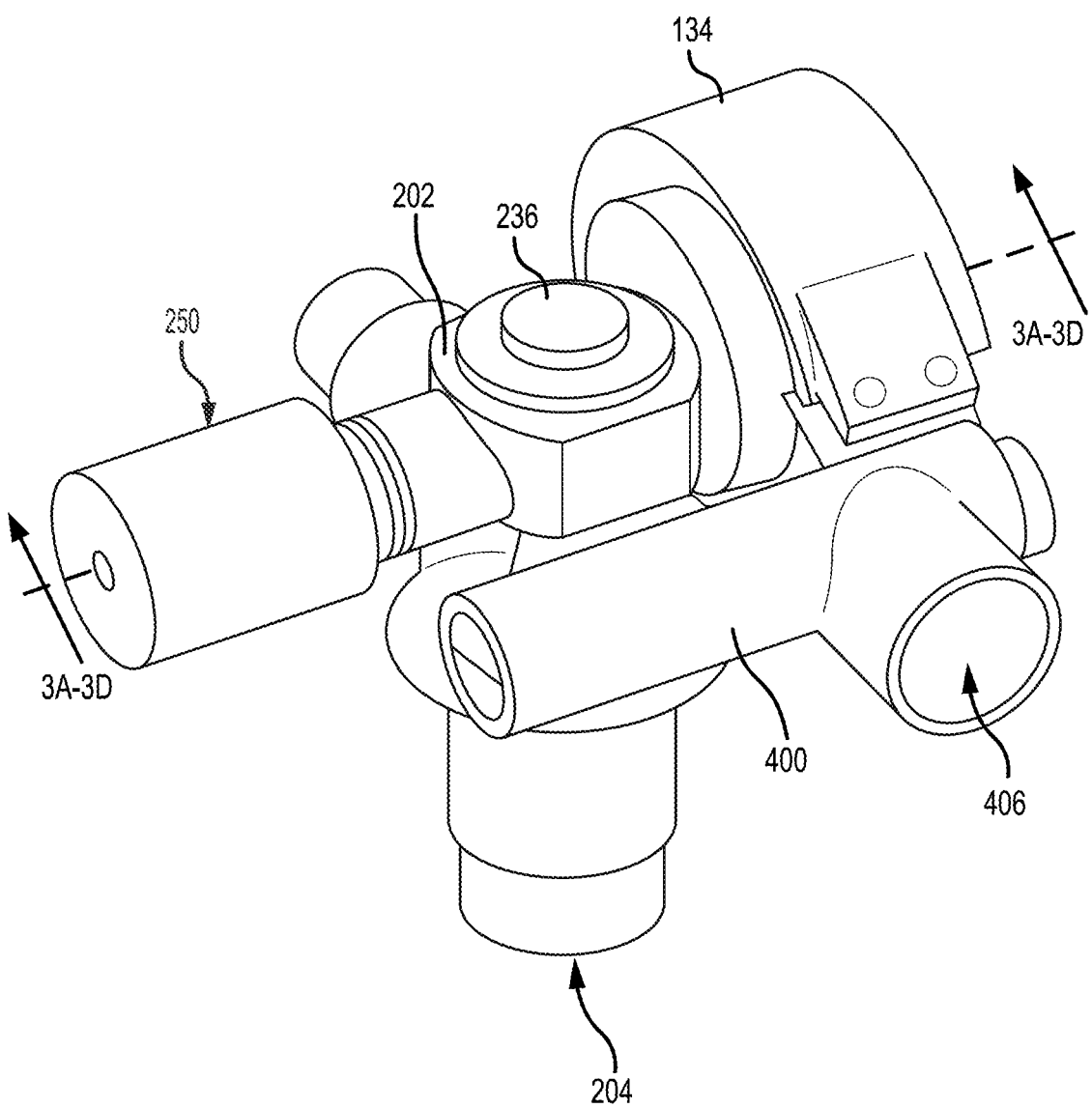
FIG. 5 illustrates a perspective view of the pressurized fluid source valve assembly of FIG. 3A through FIG. 3D, in accordance with various embodiments.

With reference to FIG. 5, a perspective view of valve assembly 140 is illustrated, in accordance with various embodiments. With respect to FIG. 5, elements with like element numbering, as depicted in FIG. 3A through FIG. 3D, are intended to be the same and will not necessarily be repeated for the sake of clarity. When the valve outlet 206 (see FIG. 3B) is placed in fluid communication with valve inlet 204, as described herein, inflation gas may exit the valve outlet 206 (see FIG. 3B) into regulator 400. The regulator 400 regulates the flow of inflation gas. The inflation gas exits the regulator 400 via outlet 406 whereby the inflation gas is routed to an inflatable device as desired. In various embodiments, the regulator 400 is integrated with the valve body 202 (i.e., the regulator 400 and the valve body 202 are monolithic). Stated differently, regulator 400 and valve body 202 may be formed as a single piece, for example additively manufactured.

Benefits and other advantages have been described herein with regard to specific embodiments. Furthermore, the connecting lines shown in the various FIGS. contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:
1. A valve arrangement for inflating an inflatable device, the valve arrangement comprising:

a valve body comprising an inlet, an outlet, a main fluid channel extending along a longitudinal axis of the valve body, a first ball detent at least partially defining the main fluid channel, and a second ball detent at least partially defining the main fluid channel;

a lifter located in the main fluid channel, the lifter configured to translate along the longitudinal axis of the valve body;

a sleeve comprising a locking ball aperture, the sleeve located in the main fluid channel and at least partially surrounding the lifter;

a locking ball disposed at least partially within the locking ball aperture;

a piston coupled to the lifter, the piston at least partially defining a command pressure cavity;

a spring configured to bias the lifter toward a ball locking position; and a valve operation initiator in fluid communication with a source of pressurized gas, the valve operation initiator controls a flow of gas into the command pressure cavity;

wherein, in response to the valve operation initiator releasing the flow of gas into the command pressure cavity, the piston is configured to translate together with the lifter with respect to the sleeve along the longitudinal axis of the valve body against the bias of the spring from the ball locking position to a ball releasing position.

2. The valve arrangement of claim 1, wherein:

in the ball locking position, the lifter urges the locking ball in the locking ball aperture and against the first ball detent so as to lock the sleeve in a closed position whereby the inlet of the valve body is sealed from the outlet of the valve body; and in the ball releasing position, the lifter releases the locking ball from the first ball detent so as to allow the sleeve to translate along the longitudinal axis of the valve body from the closed position to an open position to allow gas received at the inlet of the valve body to pass through the inlet of the valve body to the outlet of the valve body.

3. The valve arrangement of claim 1, wherein the valve operation initiator is a solenoid valve.

4. The valve arrangement of claim 3, wherein, in response to the solenoid valve being energized, the solenoid valve is configured to release the flow of gas into the command pressure cavity.

5. The valve arrangement of claim 2, wherein, in response to the sleeve translating from the closed position to the open position, the locking ball moves with the sleeve into the second ball detent.

6. The valve arrangement of claim 1, further comprising a guide bushing coupled to the valve body and at least partially defining the command pressure cavity within the main fluid channel, wherein the lifter extends through the guide bushing.

7. The valve arrangement of claim 2, further comprising a frangible burst disk disposed at the inlet of the valve body, wherein the frangible burst disk is configured to burst in response to the sleeve translating from the closed position toward the open position.

8. The valve arrangement of claim 1, wherein the lifter comprises a recess configured to accommodate the locking ball; and in response to the lifter translating to the ball releasing position, the locking ball is configured to move toward the longitudinal axis of the valve body and at least partially into the recess.

9. The valve arrangement of claim 1, further comprising a removable cap whereby the spring is accessible within the main fluid channel.

10. A valve arrangement for a pressurized fluid source, the valve arrangement comprising:

a valve body comprising an inlet, an outlet, a main fluid channel extending along a longitudinal axis of the valve body, a first ball detent at least partially defining the main fluid channel, and a second ball detent at least partially defining the main fluid channel;

a lifter located in the main fluid channel, the lifter configured to translate along the longitudinal axis of the valve body;

a sleeve comprising a locking ball aperture, the sleeve located in the main fluid channel and at least partially surrounding the lifter;

a locking ball disposed at least partially within the locking ball aperture;

a spring configured to bias the lifter toward a ball locking position; and wherein the lifter is configured to translate with respect to the sleeve along the longitudinal axis of the valve body against the bias of the spring from the ball locking position to a ball releasing position;

in the ball locking position, the lifter urges the locking ball in the locking ball aperture and against the first ball detent so as to lock the sleeve in a closed position whereby the inlet of the valve body is sealed from the outlet of the valve body; and in the ball releasing position, the lifter releases the locking ball from the first ball detent so as to allow the sleeve to translate along the longitudinal axis of the valve body from the closed position to an open position to allow gas received at the inlet of the valve body to pass through the inlet of the valve body to the outlet of the valve body.

11. The valve arrangement of claim 10, wherein the lifter comprises a recess configured to accommodate the locking ball; and in response to the lifter translating to the ball releasing position, the locking ball is configured to move toward the longitudinal axis of the valve body and at least partially into the recess.

12. The valve arrangement of claim 11, wherein the sleeve at least partially surrounds the recess.

13. The valve arrangement of claim 10, wherein, in response to the sleeve translating from the closed position to the open position, the locking ball moves with the sleeve into the second ball detent.

14. The valve arrangement of claim 10, further comprising a guide bushing disposed in the main fluid channel, wherein the lifter extends through the guide bushing.

15. The valve arrangement of claim 10, further comprising a frangible burst disk disposed at the inlet of the valve body, wherein the frangible burst disk is configured to burst in response to the sleeve translating from the closed position toward the open position.

16. The valve arrangement of claim 10, further comprising a removable cap whereby the spring is accessible within the main fluid channel.

17. The valve arrangement of claim 10, further comprising a piston coupled to the lifter.

18. A method for inflating an inflatable device, the method comprising:

energizing a valve operation initiator in fluid communication with a source of pressurized gas;

opening the valve operation initiator;

releasing a pressurized gas into a command pressure cavity of a valve body;

moving a piston against a spring bias of a spring with the pressurized gas;

moving a lifter together with the piston along a longitudinal axis of a main fluid cavity of the valve body;

urging a locking ball inward toward the longitudinal axis and at least partially into a recess of the lifter;

translating a sleeve from an initially closed position to an open position;

moving the locking ball together with the sleeve from a first ball detent to a second ball detent as the sleeve moves from the initially closed position to the open position; and fluidly coupling an inlet of the valve body with an outlet of the valve body in response to the sleeve translating from the initially closed position to the open position to release an inflation gas from the source of pressurized gas to the inflatable device.

19. The method of claim 18, further comprising rupturing a burst disk with a fluid pressure of the inflation gas in response to the sleeve translating from the initially closed position to the open position.

20. The method of claim 18, further comprising capturing the locking ball in a locking ball aperture of the sleeve.

* * * * *